USO11412344B2

(12) United States Patent
Syed et al.

(10) Patent No.: US 11,412,344 B2
(45) Date of Patent: Aug. 9, 2022

(54) MERCHANT ITEM AND SERVICE RETURN PROCESSING USING WIRELESS BEACONS

(71) Applicant: PAYPAL, INC., San Jose, CA (US)

(72) Inventors: Mobeen Syed, San Jose, CA (US); Dennis Michael Driscoll, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 656 days.

(21) Appl. No.: 16/391,164

(22) Filed: Apr. 22, 2019

(65) Prior Publication Data
US 2019/0349707 A1    Nov. 14, 2019

Related U.S. Application Data

(63) Continuation of application No. 14/453,361, filed on Aug. 6, 2014, now Pat. No. 10,271,161.

(51) Int. Cl.
| H04W 4/021 | (2018.01) |
| G06Q 20/32 | (2012.01) |
| G06Q 20/20 | (2012.01) |
| G06Q 20/36 | (2012.01) |
| H04W 4/80 | (2018.01) |
| H04W 12/12 | (2021.01) |

(52) U.S. Cl.
CPC .......... H04W 4/021 (2013.01); G06Q 20/20 (2013.01); G06Q 20/3221 (2013.01); G06Q 20/36 (2013.01); H04W 4/80 (2018.02); H04W 12/12 (2013.01)

(58) Field of Classification Search
CPC ....... H04W 4/021; H04W 4/80; H04W 12/12; G06Q 20/20; G06Q 20/3221; G06Q 20/36

USPC ........................................................ 235/383
See application file for complete search history.

(56) References Cited

U.S. PATENT DOCUMENTS

| 5,895,453 A | 4/1999 | Cook |
| 7,069,240 B2 | 6/2006 | Spero et al. |
| 2002/0019785 A1 | 2/2002 | Whitman |
| 2005/0177442 A1 | 8/2005 | Sullivan et al. |
| 2009/0048916 A1* | 2/2009 | Nuzum .................. G06Q 20/32 705/14.14 |

(Continued)

OTHER PUBLICATIONS

International Appl. No. PCT/US2015/022846, International Search Report and Written Opinion dated Jun. 26, 2015, 9 pages.

*Primary Examiner* — Thien M Le
*Assistant Examiner* — Tae W Kim
(74) *Attorney, Agent, or Firm* — Haynes and Boone, LLP

(57) ABSTRACT

There are provided systems and methods for merchant item and service return processing using wireless beacons. A merchant may include a returns and customer service area at a merchant location for use in providing refunds, exchanges, or other services related to items sold by the merchant. The merchant location may include a wireless beacon at or nearby the area. The beacon may provide communication services with a device for the user. Using the beacon, the merchant may be informed that a user has arrived at the area and pull up a receipt and/or transaction history for the user with the merchant. The merchant may also be informed about past returns by the user that may assist the merchant in preventing fraud. Moreover, the merchant may also view similar items to the item purchased by the user for use in exchanges, which may include item delivery and/or availability information.

20 Claims, 5 Drawing Sheets

(56) References Cited

U.S. PATENT DOCUMENTS

| | | |
|---|---|---|
| 2009/0125442 A1 | 5/2009 | Otto et al. |
| 2011/0087606 A1* | 4/2011 | Hammond ............. G06Q 10/06 705/304 |
| 2011/0295675 A1* | 12/2011 | Reodica ................ G06Q 30/02 705/14.34 |
| 2012/0197794 A1* | 8/2012 | Grigg .................... G06Q 20/40 705/41 |
| 2013/0085889 A1 | 4/2013 | Fitting et al. |
| 2013/0144701 A1 | 6/2013 | Kulasooriya et al. |
| 2013/0198076 A1 | 8/2013 | Zambelli Hosmer et al. |
| 2013/0246203 A1 | 9/2013 | Laracey |
| 2013/0256403 A1 | 10/2013 | MackKinnon |
| 2014/0122270 A1* | 5/2014 | Argue .................. G06Q 20/047 705/21 |
| 2014/0172697 A1 | 6/2014 | Ward et al. |
| 2014/0188708 A1 | 7/2014 | Govindarajan et al. |
| 2015/0348146 A1* | 12/2015 | Shanmugam ...... G06Q 20/3224 705/71 |

\* cited by examiner

MERCHANT ITEM AND SERVICE RETURN PROCESSING USING WIRELESS BEACONS

CROSS-REFERENCE TO RELATED APPLICATIONS

This application is a continuation of U.S. patent application Ser. No. 14/453,361, filed Aug. 6, 2014, which is incorporated herein by reference in its entirety.

TECHNICAL FIELD

The present application generally relates to merchant item and service return processing using wireless beacons and more specifically to establishing a wireless beacon at a merchant location used to return purchased items and/or services to assist and streamline a return of the purchased items and/or services.

BACKGROUND

Merchants may offer return and service processes at specific areas at merchant locations. The processes may assist a user in returning, refunding, and/or exchanging purchased items and/or services. For example, a user unhappy with a certain product may return the product or exchange the product. However, often the return process takes a significant amount of time to locate a similar item and provide the item to the user. Moreover, refunds for purchased items/services may require user financial information to be input and a receipt to be presented. This often becomes an issue for users who have lost or destroyed the receipt or users who have received the item/service as a gift. Additionally, merchants may also be victims of fraud where other users may shoplift an item and attempt a return and refund without a receipt. Thus, if the user requests cash or refuses to provide identification information, the user may not be entered in a database enabling the merchant to identify the user as a common returner that may assist the merchant in preventing fraud.

Figure 1:
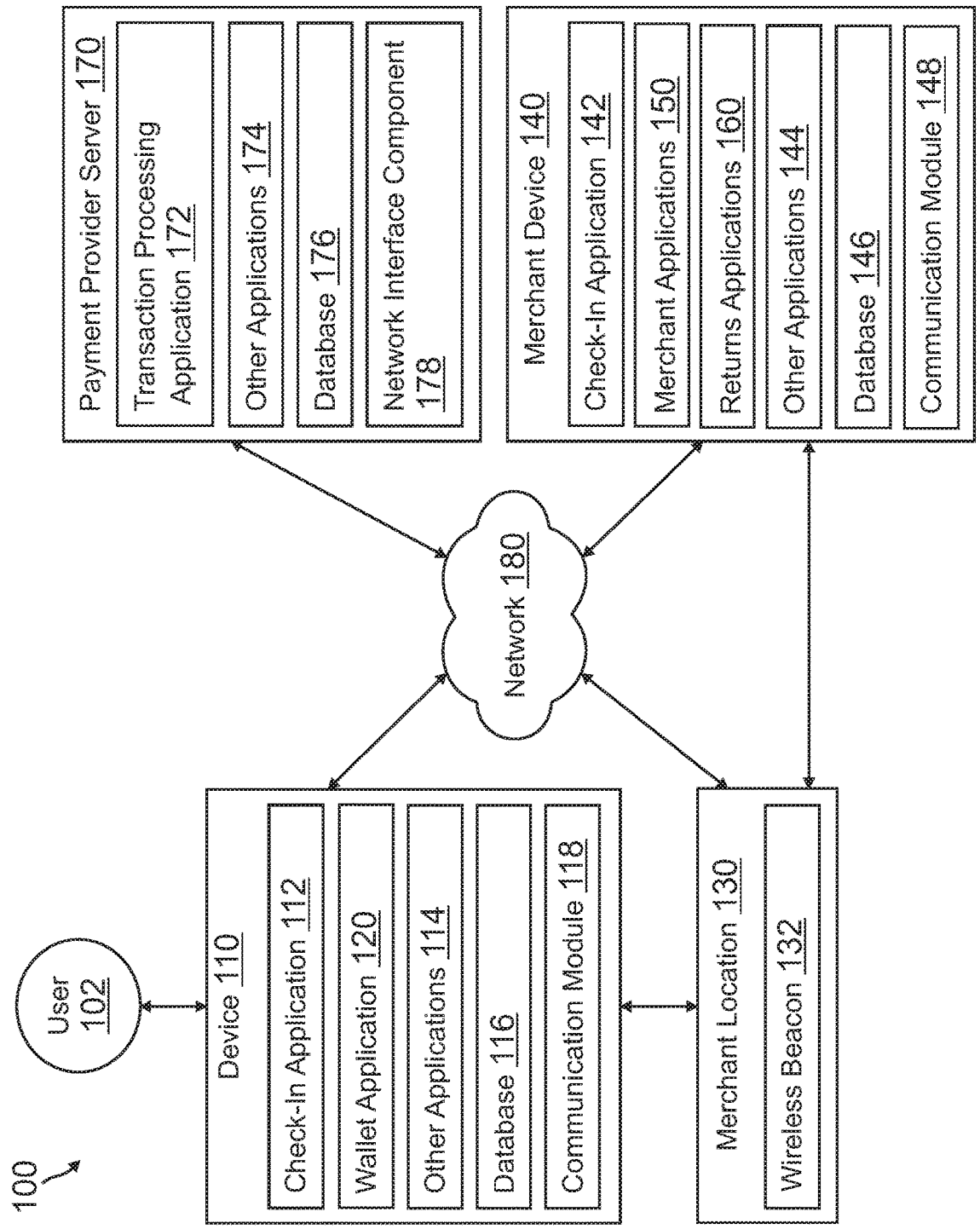
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide merchant item and service return processing using wireless beacons. Systems suitable for practicing methods of the present disclosure are also provided.

Various merchant locations may provide short range wireless communications with a device, such as through beacons using Bluetooth Low Energy (BLE), LTE Direct, or other communication protocol. These beacons may be set up at a merchant location, such as at or nearby a merchant return, exchange, and/or customer service line. The beacons may communicate with devices in possession of users to alert the users of check-in services offered through their device. The beacons may provide additional functionality, such as establishing a connection with a merchant device or server to complete transactions, including return, refund, and/or delivery services for items and/or services purchased by the users with the merchant. The beacons may communicate with the users' devices directly, including information stored in the beacons. The beacons may also provide communication with a device attached to, or in communication with, the beacon, such as the device/server of a merchant.

A merchant may sell items and/or services to users online, through phone communications, or at merchant locations. The merchant may further provide for returns, refunds, and/or exchanges of purchased items/services at a merchant location through processes available at one of the merchant locations. For example, a merchant may provide a service desk at a merchant location where a user may bring purchased items to be refunded, fixed, exchanged, or otherwise returned. The merchant may offer check-in services through one or more short range wireless beacons established at or nearby a return line, desk, station, or other return processing area at the merchant location. These beacons at the merchant location may utilize short range wireless communications to communicate with a device in possession of the user. The beacons may employ Bluetooth Low Energy (BLE), LTE Direct, or another communication protocol to emit a communication signal receivable by the user's device. The communication may include an identifier for the beacon, the user, the merchant, and/or a payment provider administering the beacons.

The user's device may be set up to passively monitor for BLE communications. When the device detects the signal and verifies the one or more identifiers, both the device and the beacon may ramp up in power and establish a connection, where the connection may further enable the device to communicate with the merchant and/or a payment provider offering payment services between the merchant and the user. The beacon may be connected to a networked device at the merchant location, or the beacon may include network functionality to communicate with other devices and/or servers, such as a server for the merchant or the payment provider. Thus, the beacon enables the user's device to establish a connection, communicate check-in information (e.g., an identifier for the user), and/or complete a check-in with the merchant location's return processing area. The check-in may be completed automatically when the user's device is in range of the beacon, or may be completed after prompting the user to check-in when the user's device is in range of the beacon.

Once the merchant has established at least one wireless beacon at or nearby the return processing area, the wireless beacon(s) may connect to the user's device when the device is in proximity to the wireless beacon(s). For example, a wireless beacon may broadcast an identifier, which, when received, may initiate a check-in for a device within an area around the wireless beacon. Thus, as the user's device enters that area, the device may connect to the wireless beacon and/or initiate the connection and check-in process. The wireless beacon(s) may be range limited to correspond to the merchant return processing area, such as by limiting the signal strength of the beacon and/or utilizing the physical boundaries of the merchant location.

Once the user's device connects to the beacon, various transactions may be initiated, accessed, and/or completed through the user's device and/or a merchant device receiving a notification that the user has checked in through their user device. For example, once the user's device connects to the beacon, the check-in information and/or identifier used to connect to the beacon by the user device may be used to look up receipts and transaction histories for the user. Thus, past receipts and transactions between the merchant and the user may be determined based on the connection between the user device and the wireless beacon. The past receipts may be recalled from a database available with the merchant or from a database for the payment provider that provides financial transaction processing and payment on behalf of the user to the merchant. The past receipts may be communicated and presented to a merchant representative at the return processing area with user information for the user (e.g., a name, identifier, address, financial information, item/service purchased in the receipt, picture of the user, etc.) so that the merchant representative may identify the user in a line at or approaching the return processing area. Additionally, the receipt may be utilized to initiate and process a return, refund, exchange, service/fix, etc., for the user of the purchased item(s)/service(s). The receipt and/or transaction history for the user may also be presented to the user, such as on a user device and/or a merchant device (e.g., a POS unit or kiosk having a computing device) so that the return process may be automated without the need to a merchant representative.

Additional information may also be determined using the check-in information and/or identifier, such as a transaction history of the user with the merchant (e.g., all past transactions), shared accounts by multiple users, fraud information available with the merchant, payment provider, or other entity, and/or past behavior of the user. The transaction history for the user may be utilized to determine a history of the user with the merchant. Thus, the transaction history may include amounts spent, purchase histories, and/or loyalty rewards that may assist the merchant in providing additional or VIP services to certain users. For example, certain users may be given a personalized merchant representative to handle their return, or may be entitled to skip a line at the return processing area based on their valued customer status. The transaction history may also be used to determine financial instruments of the user that may receive a refund of a purchase price for the returned item(s)/service(s). A loyalty account/status of the user may be affected by the return, such as offering additional benefits to entice the user to further purchase with the merchant or revoking loyalty rewards earned by the purchase that is returned.

A transaction history for the user may also be pulled to determine if the user is a frequent return and require photo identification for the user. For example, if the user has frequently returned items without receipts or has returned multiple quantities of one item using one receipt or no receipts, the merchant may determine the user is exhibiting fraudulent behavior and require additional security measures. In other embodiments, other wireless beacons or devices at the merchant location may determine if a user was recently in an area of the merchant location that the returned item/service is found, thus potentially indicating fraudulent activity. If the user has previously committed fraudulent behavior with the merchant or another entity, the merchant may be informed about the fraudulent behavior and take appropriate actions. Moreover, the payment provider or other entity may include transaction history information for past purchases and returns by the user that may assist the merchant in identifying fraudulent behavior. The user may be assigned a ranking or other score that determines how fraudulent the behavior is of the user, thus enabling the merchant to make a determination of whether to accept a return, refund, or exchange of an item/service.

The user may also utilize one or more shared payment instruments to purchase items from the merchant. Credit cards and/or payment accounts may be shared between a family (e.g., a husband and wife having the same credit card number), or two or more payment instruments may be determined to be shared based on co-locating or co-spending habits of the payment instruments. In other embodiments, signatures and/or pictures associated with the account may be stored by the merchant when the user purchases an item/service with the merchant, or they may be stored with the payment instrument when the payment instrument is established. Thus, if the user is returning an item paid for and signed by another user sharing a user account recalled through the check-in information or identifier, the merchant may determine that the user knows or otherwise is trusted by the other user and issue a refund based on the stored information about the shared accounts. Based on the degree of trust between the two users, the merchant may determine a trustworthiness score to the returning user, allowing that user to return items for other users only if trusted by the merchant. For example, two users sharing a payment instrument may entitle either user to return items for the other user, while two payment instruments that frequently co-locate may only allow some return or none.

Past behavior of the user may also be pulled and presented to the merchant and/or merchant representative when the user arrives at the return processing area. In various embodiments, a user may be returning a vehicle or other item that is rented by the user with the merchant. The vehicle or returned item may include various processing components that may accrue information for the usage of the item, for example, mileage, fuel level, uses, damage, etc. The information may be transmitted to the merchant when the user checks-in to the return processing area and a bill for the user's use of the rented item may reflect the information about the usage of the rented item. The user may be informed about the usage information and the cost for usage on the user's device and may complete a transaction for the usage using the device.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a merchant employee 104 a user device 110, a merchant location 130 and a wireless beacon 132, a merchant device 140, and payment provider server 170 in communication over a network 180. User 102, such as a consumer, may visit merchant location 130 to engage in one or more returns of items/services the user has previously purchased. Wireless beacons 130 may connect with user device 110 to find receipts and transaction histories for user 102. The receipts and/or transaction histories may be presented to merchant employee 104 on merchant device 140. Additionally, payment provider server 170 may provide payment services, receipts and transaction histories storage, and recall of those receipts and transaction histories for transactions between user device 110 and merchant device 140.

User device 110, wireless beacon 132, merchant device 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

User device 110 may be implemented using any appropriate hardware and software configured for wired and/or wireless communication with wireless beacon 132, merchant device 140, and/or payment provider server 170. For example, in one embodiment, user device 110 may be implemented as a personal computer (PC), a smart phone, laptop computer, wristwatch with appropriate computer hardware resources, eyeglasses with appropriate computer hardware (e.g. GOOGLE GLASS 0), or other wearable computing device, a computing device mounted within a vehicle (e.g., a console or heads up display computing device in a vehicle), and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 112, a wallet application 120, other applications 114, a database 116, and a communication module 118. Check-in application 112, wallet application 120, and other applications 114 may correspond to processes, procedures, and/or applications executable by a hardware processor, for example, a software program. In other embodiments, user device 110 may include additional or different software as required.

Check-in application 112 may be used by user 102 of user device 110 to establish a connection with wireless beacon 132, including a check-in with merchant location 130. Check-in application 112 may correspond to a specific application utilized by user device 110 with wireless beacon 132 and/or merchant device 140 to complete a check-in. The check-in with merchant device 140 may correspond to a process to log in to a user account of user 102 with merchant device 140 (or payment provider server 170 if payment provider server 170 provides check-in services for merchant location 130). In other embodiments, the check-in may provide and/or verify the identity of user 102, including transmission of an identifier for user 102 and/or user device 110. The check-in may be completed over network 180 with merchant device 140. In such embodiments, check-in application 112 may correspond more generally to a browser application configured to communicate with merchant device 140 over a network connection (e.g., over a connection with network 180).

In various embodiments, check-in application 112 may also receive short range wireless communications from wireless beacon 132 at a location and transmit information to wireless beacon 132, including check-in information for a check-in process with merchant device 140 (or payment provider server 170 if payment provider server 170 provides check-in services for merchant location 130) that associates user 102 with wireless beacon 132. For example, wireless beacon 132 may be located at or nearby a return processing area (e.g., a service desk, return line, etc.) where wireless beacon 132 is set up to communicate with user device 110 when user device 110 is in proximity to wireless beacon 132. Thus, wireless beacon 132 may be range limited to connect only with devices (e.g., user device 110) within a specified area, such as a radius around wireless beacon 132, a distance away from wireless beacon 132, and/or a signal direction for wireless beacon 132. Based on the proximity for connection to wireless beacon 132, check-in application 112 may transmit information to wireless beacon 132 when user 102 is nearby wireless beacon 132, enabling merchant device 140 to determine that user 102 is located in proximity to wireless beacon 132 (and thus may retrieve receipt, transaction histories, or other information corresponding to user 102).

Check-in application 112 may execute in the background of an operating system of user device 110 and be configured to establish connections, using communication module 118 of user device 110, with wireless beacon 132. The connection may be established with or without user input from user 102. For example, wireless beacon 132 may broadcast a token, such as a universally unique identifier (UUID), for reception by check-in application 112, as will be explained in more detail herein. Check-in application 112 may utilize communication module 118 of user device 110 to receive the token from wireless beacon 132. If check-in application 112 acknowledges the UUID as identifying wireless beacon 132, merchant device 140, and/or payment provider server 170 (e.g., if check-in application 112 determines the UUID corresponds to a request to establish a communication channel and/or process and complete a check-in), check-in application 112 may transmit an identifier corresponding to user 102 and/or user device 110 back to wireless beacon 132. Check-in application 112 may utilize communication module 118 of user device 110 to communicate with wireless beacon 132 (e.g., over near field communication, Bluetooth, Bluetooth Low Energy, radio, infrared, LTE Direct, or other communication protocol). The identifier from user device 110 may include, be transmitted with, concatenated with, or otherwise bundled with the identifier received from wireless beacon 132. In other embodiments, different information may be transmitted to wireless beacon 132, such as an identifier for user 102, a name or other personal information for user 102, an identifier used to recall or determine receipts, transaction histories, and/or information for user 102, or other identifying information. Thus, the information transmitted to wireless beacon 132 does not need to be utilized to process and/or complete a check-in with merchant device 140 in all embodiments.

Once a connection is established with wireless beacon 132, user device 110 may be checked-in with merchant device 140 if user 102 has not previously been checked-in. The check-in process may then associate user 102 with wireless beacon 132 used to connect to user device 110. For example, wireless beacon 132 may previous be registered as located at or nearby a return processing area of merchant location 130. Thus, merchant device 140 is informed that user 102 is attempting to return, refund, exchange, fix, or otherwise service previous item(s)/service(s) purchased by user 102. As previously discussed, in other embodiments, a check-in need not be processed and/or completed to associate user 102 with the drive through. Thus, other connections and data transfers to wireless beacon 132 may be sufficient to associate user 102 with the return processing area.

Wallet application 120 may be used, for example, to provide a convenient interface to permit user 102 to select payment options and provide payment for items and/or services. For example, wallet application 120 may be implemented as an application having a user interface enabling the user to enter payment options for storage by user device 110, provide payment to merchant device 140 (e.g., using payment provider server 170 in various embodiments), and complete a transaction for the items and/or services. In this regard, wallet application 120 may correspond to an application that may provide an interface where user 102 may enter and view information. User 102 may utilize wallet application 120 to generate a payment request for the items and/or services to be purchased by user 102. The payment request may instruct payment provider server 170 to provide payment to merchant device 140. Additionally, the payment request may include identification of a payment instrument that user 102 wishes to utilize to provide payment for the item(s)/service(s). Wallet application 120 may provide payment for items using a user account with the payment provider, such as payment provider server 170. Wallet application 120 may also provide payment through a payment card or bank account, and may further include cross-linking, allowing user 102 to identify a user account through an identifier for a separate user account (e.g. identifying a user account through a debit card account number and vice versa). Wallet application 120 may correspond to a dedicated application for payment provider server 170 (e.g., a specific device application) or may correspond to a browser application configured to view information available over the Internet or access a website corresponding to payment provider server 170.

In certain embodiments, wallet application 120 may be utilized to prepopulate a return order form when user 102 purchases one or more items/services from a merchant corresponding to merchant device 140. For example, a user may purchase an item with the merchant (e.g., during a first visit at merchant location 130 and from merchant employee 104) and utilize user device 110 to pay for the item. User 102 may further utilize user device 110 to scan the item or may enter information for the item to wallet application 120. The information for the item (e.g., bar code, stock number/inventory information, price, condition, etc.) may be utilized with merchant return information (e.g., terms for return, time limits for returning items/services, etc.) to prepopulate a return form that may be transmitted to merchant device 140 and/or stored by user device 110. Thus, when user device 110 later connects to wireless beacons 132, user 102 and/or merchant employee 104 may view the prepopulated return order form. User 102 and/or merchant employee 104 may then initiate a partial or complete return using the prepopulated return order form or may take additional actions, as will be discussed in more detail herein.

Wallet application 120 may also store and/or access information about loyalty accounts, receipts, transaction histories, prepopulated return forms, or other information corresponding to items or services purchased from a merchant corresponding to merchant device 140. For example, wallet application 120 may further include options to store receipts for purchased items and transaction histories with one or more merchants for later use, or may access such information from another source, such as merchant device 140 and/or payment provider server 170. Information stored by wallet application 120 may be transmitted to merchant device 140 when check-in application 112 forms a connection with wireless beacon 132. Thus, wallet application 120 provides information enabling user 102 to provide proof of purchase to merchant device 140 and other information assisting user 102 in performing a return of the purchased item(s)/service(s). However, in other embodiments, check-in information, an identifier, or other identification information may be transmitted by check-in application 112 and/or wallet application 120 to merchant device 140 enabling merchant device 140 to recall the aforementioned loyalty, receipt, transaction history, and/or prepopulated return form information.

In various embodiments, one or more features of check-in application 112 and wallet application 120 may be incorporated in the same application so as to provide their respective features in one application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 180, or other types of applications. Other applications 114 may also include email, texting, voice and IM applications that allow a user to send and receive emails, calls, texts, and other notifications through network 180. In various embodiments, other applications 114 may include financial applications, such as banking, online payments, money transfer, or other applications associated with payment provider server 170. Other applications 114 may include browser, social networking, and/or mapping applications, which may also be used in conjunction with check-in application 112 and/or wallet application 120. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 112, wallet application 120, and/or other applications 114, identifiers associated with hardware of user device 110, or other appropriate identifiers, such as identifiers used for payment/user/device authentication or identification. Identifiers in database 116 may be used by a payment/credit provider, such as payment provider server 170, to associate user device 110 with a particular account maintained by the payment/credit provider. Database 116 may include user device tokens and/or encryption keys, including an encryption key of wireless beacon 132, merchant device 140, and/or payment provider server 170. Database 116 may include identifying information for tokens enabling check-in application 112 to identify wireless beacon 132, merchant device 140, and/or payment provider server 170 when receiving a corresponding check-in token.

In various embodiments, database 116 may store information used by wallet application 120, such as receipts, transaction histories, loyalty account information, and/or pre-populated return order forms, which may be transmitted to merchant device 140 when user device 110 connects to wireless beacons 132.

User device 110 includes at least one communication module 118 adapted to communicate with wireless beacon 132, merchant device 140, and/or payment provider server 170. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 132 using short range communications, such as Bluetooth Low Energy, LTE Direct, WiFi, radio frequency, infrared, Bluetooth, and near field communications.

Merchant location 130 may be implemented as a physical location corresponding to a merchant where the merchant offers returns for purchased items and/or services, such as a merchant storefront, a retail location, a service/return location/department, a car or other rented item return location, etc. In this regard, merchant location 130 includes wireless beacons 132 and connectivity to merchant device 140 utilized by merchant employee 104. In various embodiments, merchant employee 104 and merchant device 140 may be located at merchant location 130. However, in other embodiments, merchant employee 104 and merchant device 140 may be remote from merchant location 130, for example, where merchant location 130 may correspond to a rental vehicle return area at an airport configured to automate rental vehicle returns. Although only one merchant location is shown, a plurality of merchant locations may offer return services for use with merchant device 140 when returning purchased item(s)/service(s).

Merchant location 130 may include physical structures, boundaries, and/or other necessary infrastructure to establish a return processing area within merchant location 130. In this respect, merchant location 130 may include lines, lanes, or other infrastructure where user 102 may enter to initiate a return process. The return process may correspond to a process to exchange, refund, fix, service, or otherwise return one or more items and/or services purchased by user 102 from the merchant corresponding to merchant location 130/merchant device 140. For example, a return processing area at merchant location 130 may correspond to a service desk at a retail store, a rental vehicle or other rental item return area, a refund/exchange counter at a merchant storefront, etc. Merchant location 130 may only offer the return processing area at merchant location 130. However, in other embodiments, merchant location 130 may include additional features and options for user 102 at merchant location 130, such as shopping and purchasing options, maintenance options, etc. Thus, merchant location 130 may correspond to a larger merchant storefront or other location where the merchant corresponding to merchant location 130/merchant device 140 may offer items and/or services for sale to user 102. In this regard, merchant location 130 may include further wireless beacons in addition to wireless beacons 132 that may track information for user 102 (e.g., visited sub-locations within merchant location 130), assist user 102 in checking in to merchant location 130, and/or provide payment processing to user 102.

Merchant location 130 of FIG. 1 includes wireless beacon 132 established at the return processing area of merchant location 130. Wireless beacon 132 may include hardware and software necessary to execute the processes and functions as described below. In other embodiments, merchant location 130 may include additional hardware and/or software as required to process the above and below described features offered by merchant location 130.

Wireless beacon 132 may be maintained, for example, by a merchant corresponding to merchant location 130/merchant device 140 and/or payment provider server 170. Wireless beacon 132 may be implemented using any appropriate hardware and software configured for wireless communication with user device 110. For example, in one embodiment, wireless beacon 132 may be implemented as a dongle device including a hardware processor and a communication module, for example, connected to device at the location of merchant employee 104. Wireless beacon 132 may also be implemented as devices incorporated within a personal computer (PC), a smart phone, laptop computer, and/or other types of computing devices capable of transmitting and/or receiving data, such as an IPAD® from APPLE®. Wireless beacon 132 may also act as a stand-alone device including a processor, communication module, and/or network interface component configured to communicate with user device 110 and/or payment provider server 170. Although wireless beacon 132 is described singly, a plurality of wireless beacons may be set up at or nearby a return processing area for merchant location 130 (e.g., at an entrance to the return processing area, in a line of the return processing area, and/or at a service desk of the return processing area). Wireless beacon 132 may be limited, either by signal range or physical boundaries, to merchant location 130 and/or the return processing area. In embodiments where merchant employee 104 and merchant device 140 are located at merchant location 130, wireless beacon 132 may be located at or nearby merchant employee 104 assisting the return processing area.

Wireless beacon 132 of FIG. 1 contains processes, procedures, and/or applications executable by a hardware processor, for example, a software program, configured to interact with user device 110, merchant device 140, and/or payment provider server 170. Thus, regardless of the implementation of wireless beacon 132 as discussed above, wireless beacon 132 may utilize a connection/check-in process and include or be connected to a communication module. In other embodiments, wireless beacon 132 may include additional or different hardware and software as required.

Wireless beacon 132 may include an application for transmitting requests to establish a connection between a device (e.g., user device 110) and wireless beacon 132. The requests may be unique to wireless beacon 132, thereby identifying wireless beacon 132. Wireless beacon 132 may utilize short range wireless communications of wireless beacon 132 to transmit the requests to establish a connection, including an identifier such as a Universally Unique Identifier (UUID). If user device 110 receives a request to establish the connection with wireless beacon 132 and responds with an identifier for user 102/user device 110 (potentially including the UUID and other information necessary to effectuate a check-in for user 102), wireless beacon 132 to ramp up in power and create a connection between user device 110 and wireless beacon 132.

Wireless beacon 132 may transmit the request to establish the connection with wireless beacon 132 as a short range wireless communication (e.g. a BLE protocol communication) including a "wake up" process for check-in application 112 of user device 110 and/or a token for wireless beacon 132 transmitting the request. In other embodiments, the request and/or connection may utilize near field communication, radio communication, infrared communication, or Bluetooth communication. Additionally, although wireless beacon 132 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 132 (e.g., user device 110) and establishment of a connection for data transfers. In other embodiments, wireless beacon 132 may correspond to other devices, such as WiFi capable devices, near field communication devices, etc.

The request may be specific to user device 110 by including information that is specific to user 102, such as a name, identifier, or user device identifier. The information specific to user 102 may be determined from a user account of user 102 or other information previously provided to merchant device 140 and/or payment provider server 170 (e.g., an identifier for user 102 provided to merchant device 140 and/or payment provider server 170, a receipt for purchased item(s)/service(s), transaction histories for user 102, a prepopulated return order form, and/or information pulled from the aforementioned sources). Thus, in certain embodiments, only user device 110 will pick up and authenticate the request, for example, if user 102 has previously performed a transaction with the merchant corresponding to merchant location 130/merchant device 140. For example, user 102 may have generated a receipt or a transaction history with the merchant, or may create a prepopulated return order form for a purchase with the merchant.

After wireless beacon 132 receives an identifier from user device 110, wireless beacon 132 may determine user 102 is in proximity to wireless beacon 132. Wireless beacon 132 may pass the identifier (and any other device's identifiers where applicable) to merchant device 140 and/or payment provider server 170 to associate user 102 (and the other users where applicable) with the wireless beacon 132. By associating user 102 with wireless beacon 132, merchant device 140 and/or payment provider server 170 may determine user 102 (and the other users where applicable) is located at the return processing area of merchant location 130 and may wish to initiate a return.

Wireless beacon 132 may utilize a communication module to pass the identifier to merchant device 140, which may then pass the identifier to payment provider server 170. However, in other embodiments, wireless beacon 132 may utilize a network connection of wireless beacon 132 to pass the identifier to payment provider server 170 directly. Thus, wireless beacon 132 includes a communication module adapted to communicate with user device 110, merchant device 140, and/or payment provider server 170. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module of wireless beacon 132 may also communicate with user device 110 and/or merchant device 140 using short range communications, such as Bluetooth Low Energy, LTE Direct, WiFi, radio frequency, infrared, Bluetooth, and near field communications.

Merchant device 140 may correspond to a device used by merchant employee 104 to provide return processing for previously purchased items and/or services by user 102. Thus, merchant device 140 may be located locally to merchant location 130 or may also function remotely to merchant location 130 and interact with user device 110 over network 180. In various embodiments, merchant device 140 may also be utilized to first view, process, and complete financial transactions with user device 110 for the items and/or services user 102 wishes to purchase. Merchant device 140 may be implemented using any appropriate hardware and software configured for wired and/or wireless communication with user device 110, wireless beacon 132, and/or payment provider server 170. For example, merchant device 140 may be implemented as a personal computer (PC), a smart phone, laptop computer, wristwatch with appropriate computer hardware resources, eyeglasses with appropriate computer hardware (e.g. GOOGLE GLASS 0), other type of wearable computing device, and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly. Moreover, in various embodiments, one or more of the applications, processes, and/or features discussed below in reference to merchant device 140 may be included in payment provider server 170 (e.g., check-in application 142 where check-in services are offered to user 102 through payment provider server 170), and vice versa.

Merchant device 140 of FIG. 1 contains a check-in application 142, merchant applications 150, returns application 160, other applications 144, a database 146, and a communication module 148. Check-in application 142, merchant applications 150, returns application 160, and other applications 144 may correspond to processes, procedures, and/or applications executable by a hardware processor, for example, a software program. In other embodiments, merchant device 140 may include additional or different software as required.

Check-in application 142 may correspond to processes to complete check-in with user device 110 for merchant location 130 (e.g., with one or more of wireless beacon 132 established at or nearby an return processing area at merchant location 130). Thus, check-in application 142 may correspond to the merchant device side application configured to receive check-in information from user device 110 and complete the check-in. The check-in request may include log in information for a user account with the merchant corresponding to merchant location 130/merchant device 140 or an account with payment provider server 170 and thus complete the check-in with user 102 by verifying the account information. For example, the check-in information may include an identifier or other account information for a user/payment account of user 102. However, in embodiments where a user account has not been previously established by user 102, check-in application 142 may receive other information identifying user 102, including a user name/identifier, user device identifier, an identifier for an account with another server, or other information. Such information may also be used to identify past transactions of user 102 with the merchant, such as receipts, transaction histories, and/or prepopulated return order forms. The check-in information may also be utilized to determine loyalty rewards for user 102 or access benefits for user 102.

Merchant applications 150 may provide information for available items and/or services to user 102, complete purchases of items and/or services by user 102, and generate receipts and transaction histories for user 102. Merchant applications 150 may correspond to one or more applications configured to process and/or complete transactions for items and/or services sold by the merchant corresponding to merchant location 130/merchant device 140 to user 102, generate receipts and transaction histories for the item(s)/service(s), and/or provide loyalty account services and benefits to user 102. Merchant applications 150 may therefore provide a convenient interface to permit the merchant and/or a merchant employee to view selected item/service information and complete a transaction for the items/services (e.g., receive payment for the items/services). The transaction may be for item(s)/service(s) sold by the merchant, for rental agreements on return of a rented item by user 102, etc. Once the transaction is approved, merchant application 152 may be utilized to request and process a payment for the items/service, for example, using payment provider server 170. In other embodiments, the merchant may also receive physical payment instruments, such as cash and/or payment cards from user 102. Thus, merchant applications 152 may also be utilized to run payment cards, complete cash transactions, and/or otherwise complete payment for the order. Once payment for the order is complete, merchant application 152 may be configured to generate a receipt and create, update, and/or process a transaction history for user 102. A receipt may document a single transaction by the user with the merchant, such as a sale of one or more items and/or services. The transaction history may include some or all receipts or other documentation of past transactions by user 102 with the merchant. The transaction history may be provided to user device 110 and/or payment provider server 170. Once a transaction is processed using merchant application 150, user 102 may create a prepopulated return order form using information from merchant applications 150 (e.g., the receipt for the transaction and/or a transaction history) with wallet application 120, as previously discussed. Thus, merchant applications 150 may receive the prepopulated return order form from user device 110 and store the form to database 146.

In various embodiments, merchant applications 150 may include inventory processing and availability information applications configured to access and/or determine inventory level or availability for items and/or services offered by the merchant corresponding to merchant location 130/merchant device 140. For example, merchant applications 150 may access information from database 146 or another source having an inventory level for an item sold by the merchant. The inventory level or availability information may assist merchant employee 104 in selling the items/services initially to user 102. Additionally, the inventory level/availability information may also be utilized by merchant employee 104 when offering an exchange, refund, fix, servicing, or other return of a purchase by user 102, for example, to locate a replacement item or for providing repair of a broken item. Merchant applications 150 may also include courier or delivery information enabling merchant employee 104 to deliver a replacement product.

Additionally, merchant applications 150 may be utilized to establish and maintain a loyalty account for user 102. Loyalty account information may include benefits and/or rewards for user 102 based on user 102's past transactions with the merchant corresponding to merchant location 130/merchant device 140. Utilizing the transaction history and/or the loyalty account, user 102 may be offered upgraded service during a return process, such as for a loyal customer. The loyalty account and/or transaction histories may offer user 102 additional benefits when purchasing an item, such as a 2 for 1 sale, 50% off price, etc. In other embodiments, merchant applications 150 may also include discount offer applications that may generate and provide discount offers to user 102. Information about benefits offered to user 102 may be utilized by returns application 160 during processing of a return.

Once a connection is established and/or a check-in is completed between user device 110 and wireless beacon 132, returns application 160 may be utilized to transmit and receive information between user device 110 and merchant device 140. For example, returns application 160 may receive check-in information or an identifier for user 102 and retrieve stored information for user 102 using the check-in information or identifier. Such information may be located with user device 110, database 146, payment provider server 170, and/or another source. Retrieved information may include receipts, transaction histories, loyalty status or preferred customer information (e.g., information enabling merchant employee 104 to determine whether to extend preferred customer benefits to user 102), and/or prepopulated return order forms.

Receipts and/or transaction histories may be presented to merchant employee 104 on merchant device 140. Additionally, identification information for user 102 may be presented with the receipts and/or transaction histories. Identification information may include a name, identifier, picture, or other information for user 102 that may assist merchant employee 104 in identifying user 102. The receipts and/or transaction histories may display the items and/or services purchased by user 102 so that merchant employee 104 may view the item(s)/service(s) and initiate a return. The receipts and/or transaction histories may also be transmitted to user device 110 so that user 102 may make a selection of one or more of the receipts for use in processing the return of the purchased item(s)/service(s).

Selection of a receipt or other purchased item/service in a transaction history by user 102 and/or merchant employee 104 may initiate a return process with merchant device 140. Merchant employee 104 may enter information (e.g., using an input device such as a keyboard, bar code scanner, or other device) to merchant device 140 when receiving the returned item(s)/service(s). In other embodiments, merchant employee 104 is not required and user 102 may scan or enter information for the returned item(s)/service(s) and place any returned purchases at a designated area in the return processing area of merchant location 130. Thus, utilizing user device 110 with wireless beacons 132, the return process for item(s)/service(s) may be automated at merchant location 130 with merchant device 140.

User 102 may return the item(s)/service(s) in exchange for another item/service. Thus, returns application 160 may receive inventory and/or availability information for replacement item(s)/service(s) from merchant applications 150 and display the availability and where the item(s)/service(s) are available to merchant employee 104, which may be transmitted to user device 110 for display to user 102. If the return of the purchase is for a fix or servicing of the item (e.g., a broken electronic), returns application 160 may determine an amount of time until the item will be available and where/when the item may be fixed/serviced.

The fixing/servicing information may be displayed to merchant employee 104 and/or transmitted to user device 110 for display to user 102.

In other embodiments, user 102 may request a refund of money or store credit. Thus, returns application 160 may initiate a refund by crediting some amount (e.g., purchase price, current price, or a devalued price based on the condition of the returned purchase) to a payment instrument of user 102. Additionally, user 102 may utilize a benefit, discount, or loyalty reward during purchase of item(s)/service(s). Thus, returns application 160 may determine a proper amount for a return based on the purchase price of the item(s)/service(s) by user 102. The payment instrument may be determined using the receipt and/or transaction histories of user 102. Additionally, payment instruments and/or payment accounts for user 102 (e.g., used by user 102, shared by user 102, etc.) may be determined using the receipts and/or transaction history, and payment for the return may be instituted with a different account as request by user 102.

In various embodiments, user 102 may attempt to return an item and/or service that was purchased by another user who shares a payment instrument with user 102. For example, a husband may attempt to return a purchase that a wife made using a shared credit card or payment account. Thus, if user 102 shares an account with another party, or co-locates/transacts with another account, the shared or corresponding account may be determined and a refund may be initiated with the shared/corresponding account. This enables user 102 to make returns for parties that share an account or utilize an account with user 102 (e.g., a family member, business employee, etc.). Returns application 160 may determine that the two parties share an account based on images and/or signatures shared in the account. In certain embodiments, the payment instrument may not be directly shared, however, two payment instruments, one for user 102 and another for a second user, may frequently co-locate or transact together. For example, two payment accounts with payment provider server 170 may frequently spend at the same location and/or at or around the same time at the same location. In other embodiments, the two payment accounts may frequently transfer money between them. Thus, returns application 160 may trust or accept a return from the user 102 for an item/service purchased by the second user's account based on the aforementioned information. A trust score may be established to determine the reliability of such a return. For example, one transfer between the two accounts may be insufficient to build a high enough trust score, while multiple transfers may be sufficient. Such information on co-locating and/or transactions between accounts may be received from a credit/debit card company and/or payment provider server 170.

In various embodiments, returns application 160 may process a return of a purchase with a loyalty account of preferred customer status for user 102. If user 102 is returning an item or service that user 102 received loyalty benefits for purchasing, returns application 160 may revoke or reduce the loyalty benefits originally conferred to user 102. However, in other embodiments, returns application 160 may provide additional benefits or loyalty rewards to user 102 when item(s)/service(s) are returned to incentivize user 102 to return and/or perform additional purchases with the merchant.

Returns application 160 may also display and/or process loyalty accounts, preferred customer status, and/or transaction histories to assist merchant employee 104 in determining whether to provide preferred or VIP assistance to user 102 during a return processing. For example, merchant employee 104 or returns application 160 may determine user 102 is a frequent shopper with the merchant corresponding to merchant location 130/merchant device 140. In other embodiments, user 102 may sign up for or purchase a VIP assistance package with the merchant. Thus, when user device 110 connects and/or checks-in with wireless beacon 132, returns application 160 may display the preferred/VIP customer information to merchant employee 104 so that additional assistance may be provided to user 102 (e.g., bypassing a line, providing a separate line, etc.). The additional assistance may also be transmitted to user device 110, such as instructing user 102 to bypass a line, providing a separate line for user 102, showing information for a merchant representative (e.g., merchant employee 104) sent directly to user 102, etc. The merchant representative sent to user 102 may also be informed to assist user 102 directly.

Returns application 160 may also display the transaction histories and/or previous behavior of user 102 to assist merchant employee 104 in detecting fraudulent behavior and fraudulent returns by user 102. If user 102 is a frequent returner, or is returning multiple quantities of a specific item with a single or no receipt, returns application 160 may populate the potentially fraudulent activity and alert merchant employee 104. Additionally, returns application 160 may require additional security information if fraudulent behavior is detected, such as personal information and identification (e.g., a driver license). Fraudulent activity may be detected based on the return by user 102, such as if user 102 has never previously generated a receipt for an item/service user 102 is attempting to return. Thus, if the transaction history determined using returns application 160 after receiving check-in information or an identifier from wireless beacon 132 does not have a previous purchase transaction for the item(s)/service(s), user 102 may have shoplifted or stolen the item(s)/service(s). In other embodiments, user 102 may attempt a return for a purchase that has already been returned. Thus, the transaction history may include information showing that the item(s)/service(s) user 102 is returning may be shoplifted/stolen because user 102 has previously returned the purchase.

In other embodiments, behavior of user 102 prior to the return may be utilized to detect fraudulent activity. For example, additional wireless beacons may be established throughout merchant location 130 where merchant location 130 corresponds to a retail location where user 102 may purchase items and/or services. Thus, if user 102 is previously determined to be in an area of merchant location 130 having the item(s)/service(s) that user 102 is attempting to return, returns application 160 may alert merchant employee 104 that user 102 may have shoplifted/stolen the item(s)/service(s). In other embodiments, merchant device 140, payment provider 170, and/or another entity may have information about past fraudulent behavior of user 102. Thus, returns application 160 may alert merchant employee 104 that user 102 has a history of fraudulent behavior.

As previously discussed, user 102 may prepopulate a return order form using wallet application 120 after entering or scanning information for a purchase. Once user 102 has generated a prepopulated return order form, the form may be transmitted to merchant device 140 for storage or held by user device 110. Thus, when user device 110 connects to wireless beacons 132, the prepopulated return order form may be presented to merchant employee 104 in returns application 160. Merchant employee 104 may then utilize returns application 160 to accept the form in total (e.g., no scanning of items required), partially accept the form for only the item(s)/service(s) user 102 wishes to return (e.g., through scanning the returned item(s)/service(s)), or deny the RMA and then manually scan of each of the returned item(s)/services. Thus, in cases of frequent purchases by user 102, user 102 may scan the returned item(s)/service(s) and identify which transaction from a retrieved list of transactions that contain the returned item(s)/service(s) (e.g., using user device 110). Additionally, returns application 160 may override user 102's selections based on store policy (e.g., a return policy limit, a time limit of validity of the prepopulated return order form, etc.). Merchant employee 104 may then utilize returns application 160 to cancel the override or manually change the transaction that the item(s)/service(s) are related to (lowest sale price, most recent purchase date, promotional/discount related purchases, etc.).

As previously discussed, the return by user 102 may also be a return of a rental item, such as a rental vehicle. Thus, returns application 160 may receive information corresponding to the use of the rental item by user 102. Returns application 160 may utilize the usage information with merchant applications 150 to generate a sales transaction covering the usage of the rental item by user 102. The usage of the rental item may be received from input by merchant employee 104. However, the rental item may also include processing components that accrue and determine the usage of the rental item and transmit that usage to merchant device 140 for processing by returns application 160. The sales transaction may be transmitted to user device 110. Returns application 160 may process the return of the rental item by indicating the rental item has been returned, is available for further rental, or required maintenance, review, cleaning, etc.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 180, or other types of applications. In various embodiments, other applications 144 may include financial applications, such as banking, online payments, money transfer, or other applications associated with payment provider server 170. Other applications 144 may contain other software programs, executable by a processor, including a graphical user interface (GUI) configured to provide an interface to the user.

Merchant device 140 may further include database 146 which may include, for example, identifiers such as operating system registry entries, cookies associated with check-in application 142, merchant applications 150, and/or other applications 144, identifiers associated with hardware of merchant device 140, or other appropriate identifiers, such as identifiers used for payment/user/device authentication or identification. In one embodiment, identifiers in database 146 may be used by payment provider server 170 to associate merchant device 140 with a particular account maintained by payment provider server 170. Database 146 may also store user 102's information, including check-in information, an identifier, etc., for user 102, and any other users associated with user 102 while ordering with user 102. Database 146 may include receipts for purchases by user 102 and transaction histories for purchased items by user 102 to present proof of purchase. Information in database 146 may include information used by merchant applications 150 and/or returns application 160 to process a transaction, initiate and process a return for a purchase, detect fraudulent behavior, and/or provide preferred/VIP customer assistance.

Merchant device 140 includes at least one communication module 148 adapted to communicate with user device 110, wireless beacon 132, and/or payment provider server 170. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacon 132 using short range communications, such as Bluetooth Low Energy, LTE Direct, radio frequency, infrared, Bluetooth, and near field communications.

Payment provider server 170 may be maintained, for example, by an online payment service provider, which may provide payment services and/or processing for financial transactions on behalf of a user. In this regard, payment provider server 170 includes one or more processing applications which may be configured to interact with user device 110, wireless beacon 132, and/or merchant device 140 to facilitate payment for a transaction. In one example, payment provider server 170 may be provided by PAYPAL®, Inc. of San Jose, Calif., USA. However, in other embodiments, payment provider server 170 may be maintained by or include a credit provider, financial services provider, financial data provider, and/or other service provider, which may provide payment services to user 102 and/or merchant employee 104. Moreover, in various embodiments, one or more of the applications, processes, and/or features discussed below in reference to payment provider server 170 may be included in merchant device 140, and vice versa.

Payment provider server 170 of FIG. 1 includes a transaction processing application 172, other applications 174, a database 176, and a network interface component 178. Transaction processing application 172 and other applications 174 may correspond to processes, procedures, and/or applications executable by a hardware processor, for example, a software program. In other embodiments, payment provider server 170 may include additional or different software as required, such as a check-in application as discussed in reference to merchant device 140, where such check-in processes and features are instead provided by payment provider server 170.

Transaction processing application 172 may be configured to receive information from and/or transmit information to user device 110 and/or merchant device 140 for processing and completion of financial transactions. Transaction processing application 172 may include one or more applications to process financial transaction information from user 102 and merchant employee 104 by receiving a request to complete a transaction for items and/or services offered by merchant employee 104. The request may correspond to a payment from user 102 to merchant employee 104. The payment may include a user account identifier or other payment information (e.g. a credit/debit card or checking account) for user 102 and a receiving account for the merchant corresponding to merchant location 130/merchant device 140. Additionally, the payment may include a payment amount and terms of payment. Transaction processing application 172 may complete the transaction by providing payment to the merchant through the merchant's account/payment information. Additionally, transaction processing application 172 may provide receipts to user device 110 and/or merchant device 140 for completion and documentation of the financial transaction. Transaction histories documents part or all of transactions between user 102 and the merchant may be provided to user device 110 and/or merchant device 130 by transaction processing application 172. The transaction history may include payments for item(s)/service(s), credit extensions by the merchant to user 102, returns of purchases by user 102 to the merchant, loyalty rewards and benefit usage by user 102 with the merchant, and/or fraudulent behavior of user 102 with the merchant and/or other merchants. For example, receipts and transaction histories may be provided to user device 110 and/or merchant device 140 to allow for merchant employee 104 to view a payment transaction and determine a past history of transactions between user 102 and the merchant.

In various embodiments, payment provider server 170 includes other applications 174 as may be desired in particular embodiments to provide features to payment provider server 170. For example, other applications 174 may include security applications for implementing server-side security features, programmatic server applications for interfacing with appropriate application programming interfaces (APIs) over network 180, or other types of applications. Other applications 174 may contain software programs, executable by a processor, including a graphical user interface (GUI), configured to provide an interface to a user.

Additionally, payment provider server 170 includes database 176. As previously discussed, user 102 and/or the merchant corresponding to merchant location 130/merchant device 140 may establish one or more payment accounts with payment provider server 170. User accounts in database 176 may include merchant/user information, such as name, address, birthdate, payment/funding information, additional user financial information, and/or other desired user data. User 102 and/or the merchant may link to their respective payment accounts through a user, merchant, and/or device identifier. Thus, when an identifier is transmitted to payment provider server 170, e.g. from user device 110 and/or merchant device 140, a payment account belonging to user 102 and/or the merchant may be found. In other embodiments, user 102 and/or merchant employee 104 may not have previously established a payment account and may provide other financial information to payment provider server 170 to complete financial transactions, as previously discussed. Database 176 may further include additional information received from user device 110 and/or merchant device 140, such as check-in information and identifiers and/or and transaction information (e.g., receipts, transaction histories, loyalty benefits, and/or fraudulent behavior) for user 102 and the merchant.

In various embodiments, payment provider server 170 includes at least one network interface component 178 adapted to communicate user device 110, wireless beacon 132, and/or merchant device 140 over network 180. In various embodiments, network interface component 178 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
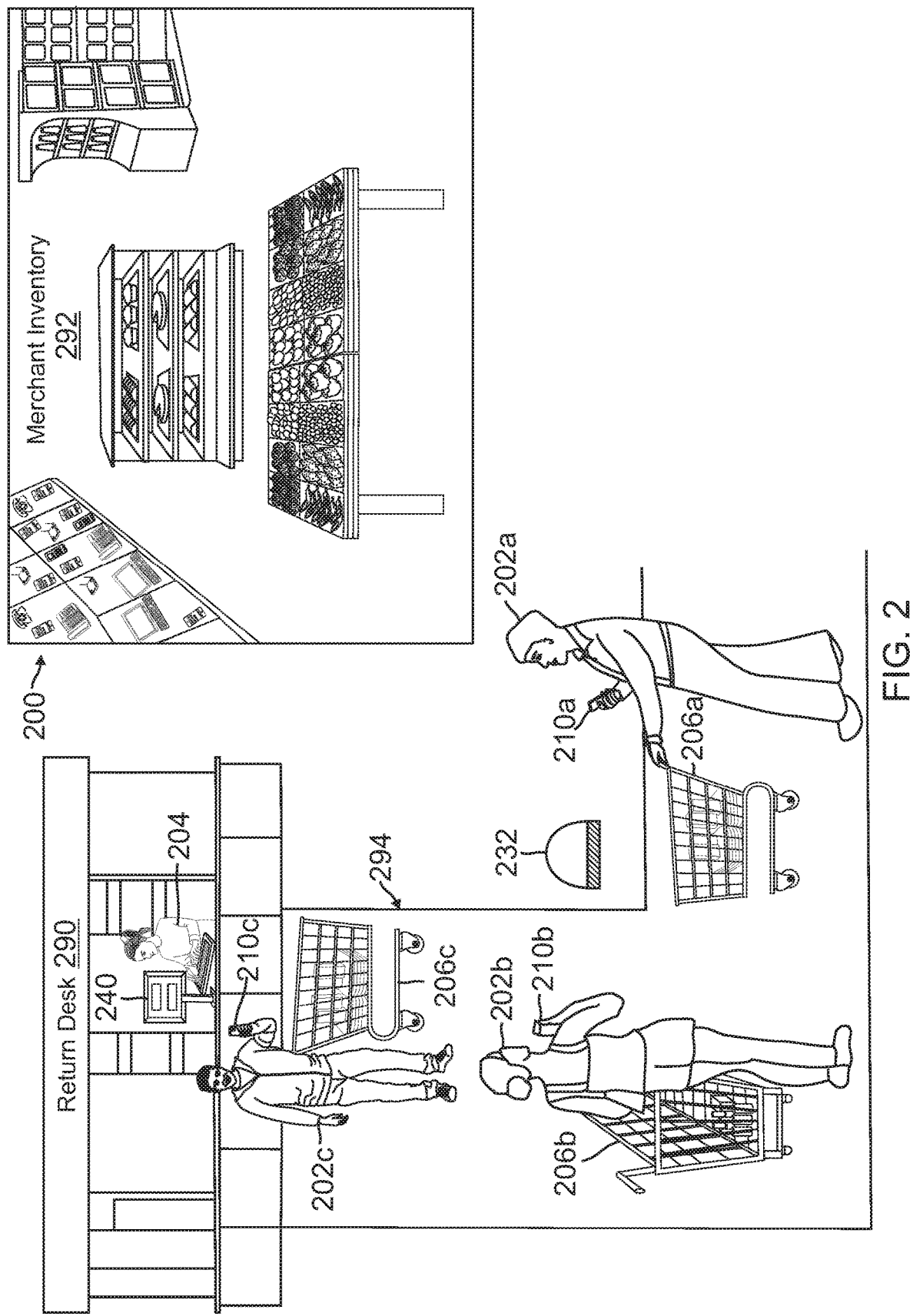
FIG. 2 is an exemplary environment displaying users checking in to a merchant return line through a wireless beacon located at the merchant return line, according to an embodiment.

FIG. 2 is an exemplary environment displaying users checking in to a merchant return line or area through a wireless beacon located at or near the merchant return line, according to an embodiment. Environment 200 of FIG. 2 includes a user 202a having a device 210a, a user 202b having a device 210b, and a user 202c having a device 210c, all corresponding generally to user 102 and user device 110, respectively, of FIG. 1. Additionally, environment 200 includes a wireless beacon 232 and a merchant device 240 corresponding generally to wireless beacon 132 and merchant device 140, respectively, of FIG. 1.

Environment 200 may correspond to a merchant location, such as merchant location 130 of FIG. 1, where a user may return purchased items and/or services to a merchant corresponding to the merchant location. However, in other embodiments, environment 200 may also correspond to a sub-location or area of a larger merchant location where a user returned or returns the purchased item(s)/service(s). Thus, environment 200 includes a return desk 290, a merchant inventory 292, and a return line 294. Located near return line 294 is wireless beacon 232 configured to connect to one or more of user device 210a, 210b, and 210c. Thus, when users 202a, 202b, and 202c arrive at or near return line 294 with user devices 210a, 210b, and 210c, respectively, user devices 210a, 210b, and 210c may connect and/or check-in to wireless beacon 232 to alert merchant employee 204 through merchant device 240 that users 202a, 202b, and 202c are in or near return line 294.

Once merchant employee 204 is alerted that users 202a, 202b, and 202c are in or near return line 294, merchant employee 204 may view user information and initiate a return process using merchant device 240. Merchant employee 204 may utilize the user information to determine user 202c is at or near the front of the line, and view additional information for user 202c, such as receipts, transaction histories, loyalty accounts or preferred customer status, fraudulent behavior, and/or prepopulated return order forms. User 202c may also perform a "wave" or alert function with user device 210c to alert merchant employee 204 that user 202c is at or near the front of return line 294. Once merchant employee 204 pulls up the user and return information for user 202c, merchant employee 204 may begin the return process and process a return of a purchase.

User 202c brings an item 206c with them to return to merchant employee 204. Merchant employee 204 may scan item 206c or input information for item 206c to determine the correct receipt for item 206c that user 202c wishes to return. In other embodiments, user 202c may utilize user device 210c to scan them item or may select the receipt corresponding to item 206c from a list of receipts presented on user device 210c. Merchant employee may also use merchant device 240 to view the inventory and/or availability of item(s)/service(s) available in merchant inventory 292 to replace, service, and/or fix item 206c. Thus, merchant employee 204 may perform refunds, or may offer exchanges, servicing, and/or repair using merchant inventory 292.

As user 202a arrives at or near return line, user 202a may be alerted that user device 210a has connected to wireless beacon 232 and may view options for returning items and/or services. Thus, users 202a and 202b may utilize user devices 210a and 210b, respectively, to view receipts, prepopulated return order forms, and transaction histories for an item 206a and an item 206b that user 202a and user 202b, respectively, wishes to return. Thus, prior to arriving at return desk 290, users 202a and 202b may select one or more items and/or services to return and begin accepting conditions for return, prices for return, or return order forms for items 206a and 206b. Where user 202a and/or user 202b has established a prepopulated return order form for a purchase of items 206a and/or 206b, user 202a and/or user 202b may review the return order form, insure the accuracy of the form, and select which item(s)/service(s) for the faun are to be returned. Where return desk 290 is fully or partially automated, users 202a, 202b, and/or 202c may process and/or complete the return request using user devices 210a, 210, and 210c, respectively.

Figure 3:
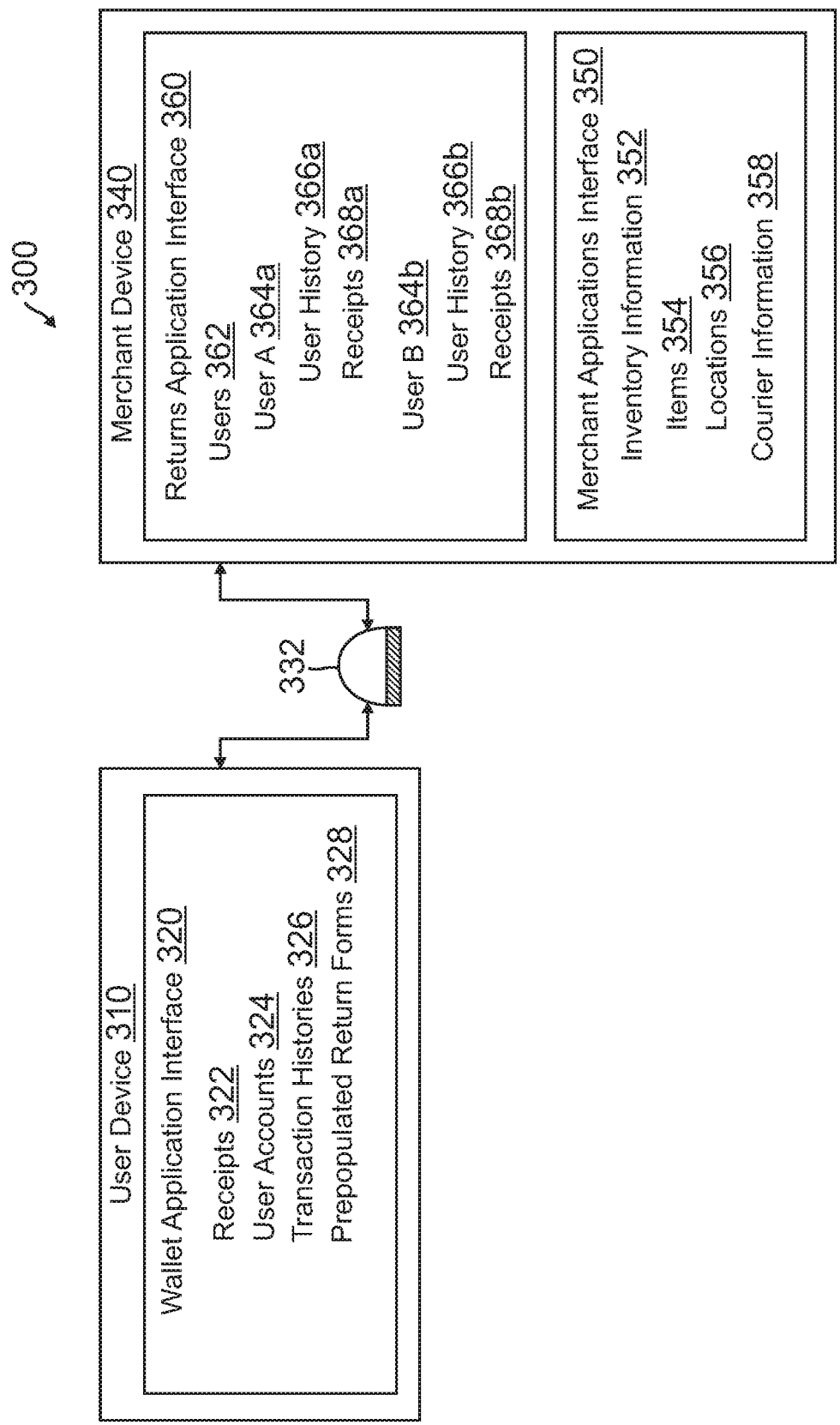
FIG. 3 is an exemplary system environment showing a user interface of a merchant device displaying receipts and transaction histories for users checked-in to a merchant return line through a wireless beacon, according to an embodiment.

FIG. 3 is an exemplary system environment showing a user interface of a merchant device displaying receipts and transaction histories for users checked-in to or near a merchant return line through a wireless beacon, according to an embodiment. Environment 300 of FIG. 3 includes a device 310, a wireless beacons 332, and a merchant device 340 corresponding generally to user device 110, wireless beacon 132, and merchant device 140, respectively, of FIG. 1.

User device 310 displays a wallet application interface 320 corresponding generally to the processes and features described in reference to wallet application 120 of FIG. 1. Wallet application interface 320 may display information and process used by a user (not shown) of user device 310 while returning a purchase of items and/or services. Thus, wallet application interface 320 includes receipts 322, user accounts 324, transaction histories 326, and prepopulated return forms 328. Wallet application interface may display information generally or after connecting to wireless beacon 332. Receipts 322 may be utilized by the user to view previous receipts for purchases of item(s) and/or service(s), and the receipts may be based on the identifier used by user device 310 while connecting to wireless beacons 332. Additionally, the receipts may correspond to user accounts 324, such as payment accounts or financial instruments used by the user to pay for purchases. User accounts 324 may include shared accounts as well, which may be used by merchant device 340 to determine if the user is returning an item for another user. The user may view transaction histories 326 that may assist the user in identifying purchases for return. Moreover, prepopulated return forms 328 may also be used to determine if the user has previously generated a return form when the user completes a purchase of item(s)/service(s). The forms under prepopulated return forms 328 may display information entered by the user and may be transmitted to merchant device 340.

Additionally, merchant device 340 displays a returns application interface 360 and a merchant applications interface 350 corresponding generally to the processes and features described in reference to returns application 160 and merchant applications 150, respectively, of FIG. 1. Returns application interface 360 may display information for use in initiating and processing a return by one or more users. Thus, when a device, such as user device 310, connects and/or checks-in using wireless beacon 332, returns application interface 360 may display information for users wishing to perform a return. Returns application interface 360 includes users 362 having a user A 364a and a user B 364b. User A 364a and user B 364b may correspond to check-in information and/or an identifier for two users, a user A and a user B. Thus, in addition to the check-in information/identifier, user A 364a also shows a user history 366a and receipts 368a. User history 366a may include a transaction history, loyalty/preferred customer benefits, and/or user behaviors, such as fraudulent behaviors, that the merchant employee (not shown) corresponding to merchant device 340 may utilize during a return process for the user A. Receipts 368a may include receipts for purchases by user A, and may be utilized to initiate and process a return. Similarly, a user history 366b and receipts 368b may display similar information for the user B. Thus, user A 364a and user B 364b may also include further information, such as prepopulated return forms, rental item return prices and transactions, etc.

Merchant applications interface 350 may be utilized to assist the merchant corresponding to merchant device 340 in locating information for use in completing a refund, exchange, service, or repair of an item/service returned by the user corresponding to user device 310. Merchant applications interface 350 includes inventory information 352 and courier information 358. Inventory information 352 may be utilized to determine if the merchant may exchange, service, or fix an item. Thus, inventory information 352 includes items 354 and locations 356. Items 354 may include information of available items and/or available services, such as a stock number, delivery date, etc. Locations 356 may display location information for items 354 to assist the merchant in locating the items. Moreover, in certain embodiments, the merchant may provide delivery or courier services for an exchanged, serviced, or fixed item. Thus, courier information 358 may be utilized to assist the merchant in provide for delivery or courier services of the item to the user.

Figure 4:
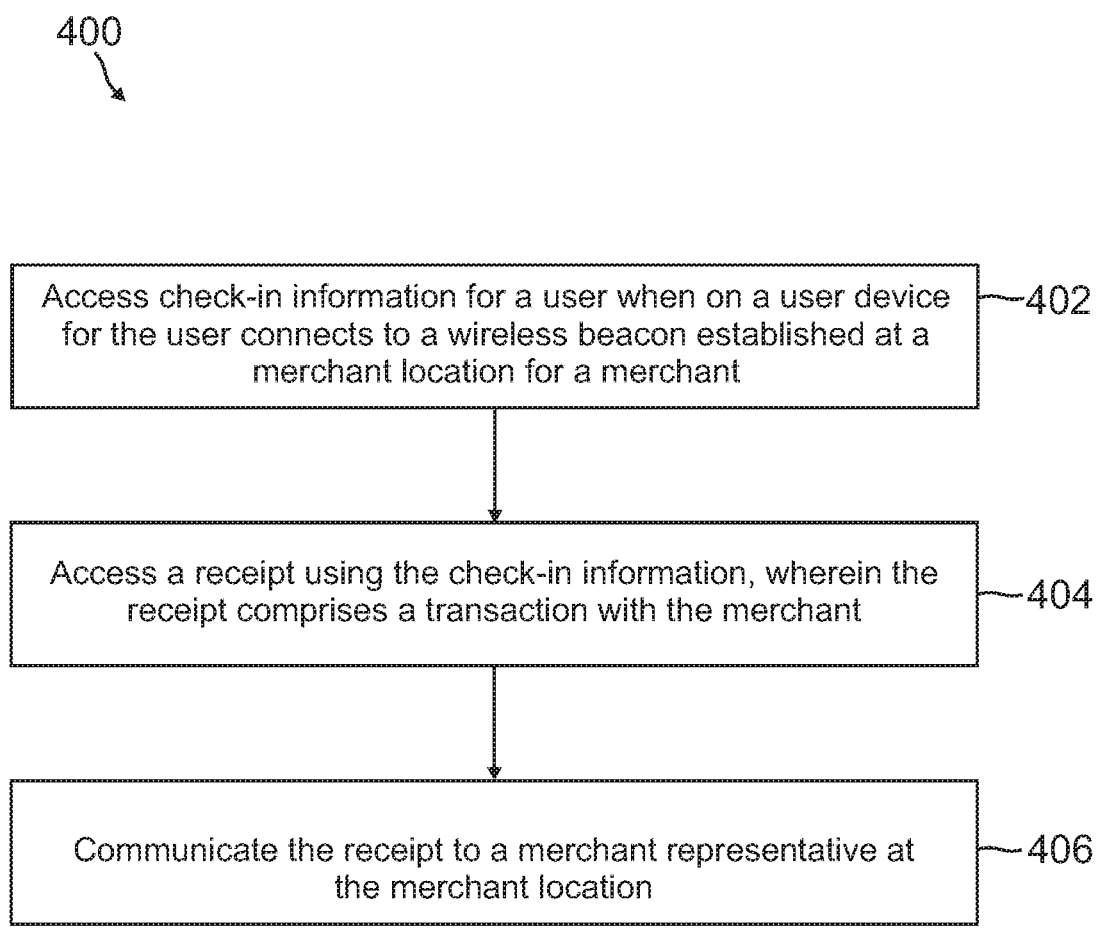
FIG. 4 is a flowchart of an exemplary process for merchant item and service return processing using wireless beacons, according to an embodiment.

FIG. 4 is a flowchart of an exemplary process for merchant item and service return processing using wireless beacons, according to an embodiment. Note that one or more steps, processes, and methods described herein may be omitted, performed in a different sequence, or combined as desired or appropriate.

At step 402, check-in information for a user is accessed when a user device for the user connects to a wireless beacon established at a merchant location for a merchant. The user device and the wireless beacon may connect using one of near field communication, radio communication, infrared communication, Bluetooth communication, Bluetooth Low Energy (BLE) communication, WiFi communication, and LTE Direct communication. In other embodiments, the check-in information may be accessed based on a connection between the user device and the wireless beacon. The merchant location may correspond to a return processing area or location, a merchant storefront, a retail location, a rental item location and/or rental item return location, or other physical place the user may return an item and/or service.

A receipt is accessed using the check-in information, at step 404, wherein the receipt comprises a transaction with the merchant. The transaction may comprise a first item or a first service sale by the merchant, such as to the user or to another user with a shared or linked account with the user. Thus, in certain embodiments where the receipt is a transaction with the merchant by another user, account information of the first user may be determined using the check-in information and the user may be associated with the other user using the account information. The account information may comprise one of a payment account with a payment provider, a credit account with the merchant, a credit or debit card, or a bank account. The account information may be linked between the two users using co-locating and/or transactions shared or processed between the two accounts. For example, the account information may comprise a first account for the user having a transaction history with a second account for the other user. Additionally, the account information may comprise an account shared by the first user and the second user. Thus, a relationship between the user and the other user may be determined and communicated to a merchant representative.

At step 406, the receipt is communicated to a merchant representative at the merchant location. For example, the receipt may be transmitted to a merchant device for the merchant representative. In addition to the receipt, a user profile for the user may be determined using the receipt. The user profile may further be determined after accessing a transaction history of purchases by the user with the merchant, a transaction history of returns by the user with the merchant, and/or other receipts by the user with the merchant. The user profile may be used to determine fraudulent history. For example, the receipt, the transaction histories, and/or the user profile may be utilized to determine whether the user is exhibiting fraudulent behavior or a likelihood of fraudulent action by the first user.

The merchant may determine a second item or a second service for replacement of the first item or the first service in the receipt. The information for the second item/service may be communicated to the merchant representative, including a location, cost, delivery time, and/or inventory level/availability. The merchant may also offer courier services for delivery of the second item/service.

Figure 5:
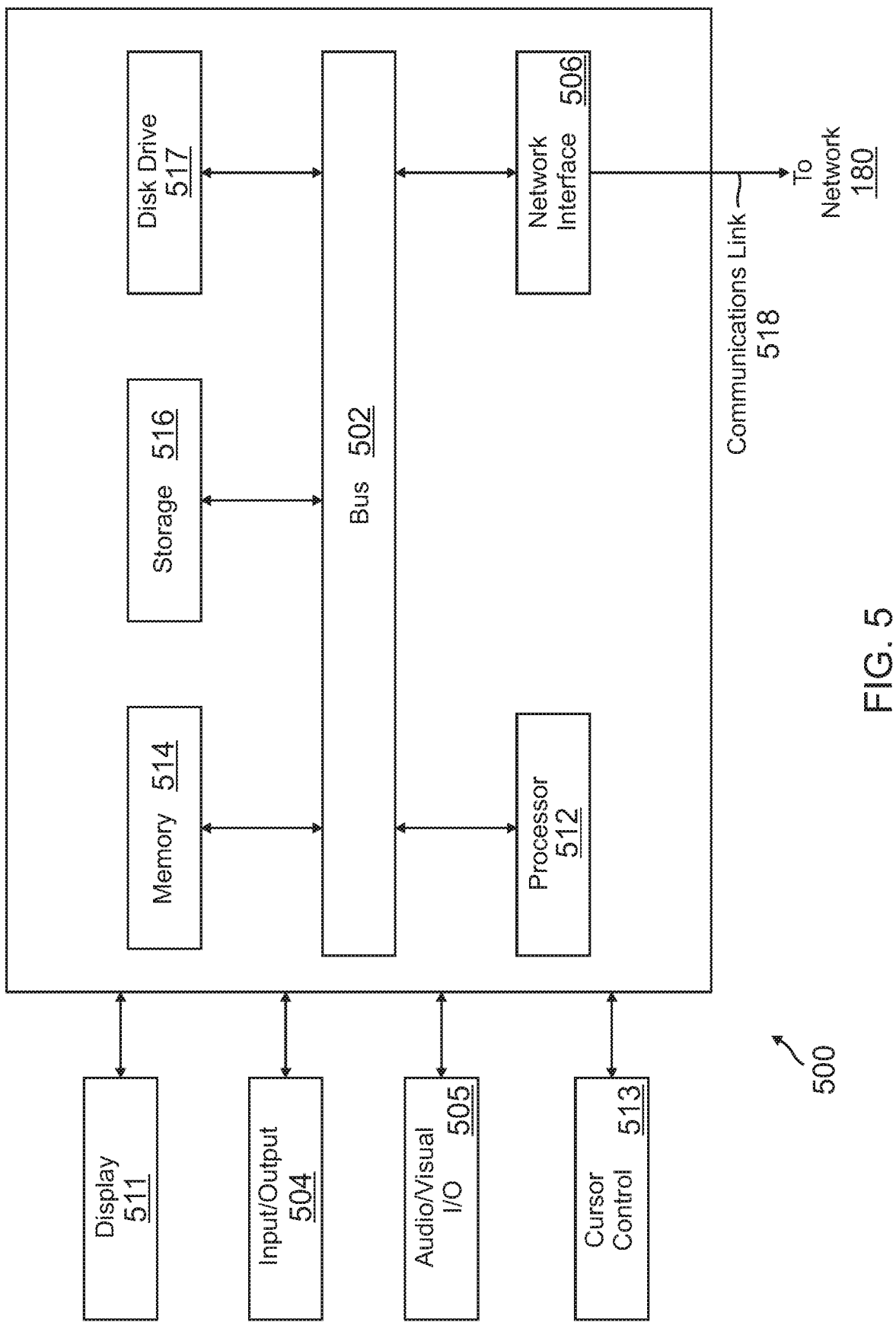
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 180. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving, from a merchant device over a network, a device identifier for a mobile device of a first user based on a first wireless connection between the mobile device and a wireless communication device connected to the merchant device at a merchant location, wherein the device identifier is received automatically based on the first wireless connection;
predicting, from the first wireless connection, that the first user requires a digital receipt associated with a past purchase at the merchant location;
determining the digital receipt based on the device identifier and the merchant location;
determining an item for the past purchase from the digital receipt;
communicating the digital receipt with an identification of the item to the mobile device and the merchant device;
receiving, from the merchant device, a return request for the item;
determining a payment instrument for the return request based on the digital receipt and a transaction history for the first user; and
processing the return request for the payment instrument.

2. The system of claim 1, wherein the operations further comprise:
determining an association between the first user and a second user associated with the past purchase using the device identifier,
wherein the determining the digital receipt is further based on the association.

3. The system of claim 2, wherein the association comprises a trust score for a connection between the first user and the second user.

4. The system of claim 3, wherein the trust score is based on at least one of a previous co-location shared between the first user and the second user, a shared payment instrument for the first user and the second user, a shared spending history between the first user and the second user, or a shared account for the first user and the second user.

5. The system of claim 1, wherein the operations further comprise:
determining customer loyalty information for the first user,
wherein the customer loyalty information is communicated to the mobile device and the merchant device with the digital receipt.

6. The system of claim 5, wherein the operations further comprise:
updating the customer loyalty information based on the processing the return request.

7. The system of claim 1, wherein the operations further comprise:
determining a likelihood of fraud score for the return request;
determining required authentication information for the return request based on the likelihood of fraud score; and
communicating the required authentication information required for the return request to at least the merchant device,
wherein the return request is further received with an authentication input associated with the required authentication information, and wherein the processing the return request is based on the authentication input matching the required authentication information.

8. The system of claim 7, wherein the determining the likelihood of fraud score is based on a return history by the first user, a user action at the merchant location prior to the return request, or the payment instrument used for the return request.

9. The system of claim 7, wherein the operations further comprise:
determining whether the mobile device was previously located in a sub-area of the merchant location associated with the past purchase,
wherein the likelihood of fraud score is further based on the determining whether the mobile device was previously located in the sub-area.

10. The system of claim 1, wherein the operations further comprise:
in response to determining the digital receipt, communicating an alert to the merchant device that the mobile device is at the merchant location, wherein the alert comprises an identification of the first user associated with the device identifier.

11. A method comprising:
receiving, by a point-of-sale (POS) device at an item return area of a merchant location, a device identifier for a mobile device of a user from a first wireless device connected to the POS device;
predicting, based on the mobile device being at the item return area, that the user requires a digital receipt for an item previously purchased by the user at the merchant location;
determining, by the POS device, the digital receipt based on the device identifier and a purchase history of the user with a merchant associated with the merchant location;
communicating, by the POS device, the digital receipt with an identification of the item to the mobile device;
receiving, by the POS device from the mobile device, first input indicating a request for one of a return or a refund by the user associated with the item based on the digital receipt;
receiving, by the POS device, second input to the POS device, wherein the second input indicates an acceptance of the request, and wherein the second input comprises additional information that validates the user with the digital receipt;
determining, by the POS device, a payment instrument for the return or the refund based on the digital receipt; and
processing, by the POS device, the request for the one of the return or the refund to the payment instrument with an online transaction processor system.

12. The method of claim 11, wherein prior to receiving the second input, the method further comprises:
determining a transaction history for the user using the digital receipt;
determining the additional information required from the user to validate the user with the digital receipt based on the transaction history and the digital receipt; and communicating the additional information required from the user to the mobile device.

13. The method of claim 12, wherein prior to determining the additional information, the method further comprises:
determining a risk score for the request for the one of the return or the refund based on the transaction history,
wherein the determining the additional information is further based on the risk score.

14. The method of claim 12, wherein the additional information comprises one of a photo identification, a physical receipt, or a payment card used for the item previously purchased by the user.

15. The method of claim 11, wherein prior to receiving the second input, the method further comprises:
determining that the mobile device was previously located in a sub-area of the merchant location having the item,
wherein the determining the additional information is further based on the determining that the mobile device was previously located in the sub-area.

16. The method of claim 11, further comprising:
determining a loyalty account for the user with the merchant location based on device identifier;
determining a service available to the user at the item return area based on the loyalty account; and
communicating the service to the mobile device.

17. A non-transitory machine-readable medium having stored thereon machine-readable instructions executable to cause a machine to perform operations comprising:
detecting, over a network, a mobile device of a user via a short range wireless connection between the mobile device and a first wireless device at a return processing sub-area of a merchant location for a merchant;
determining, based on the short range wireless connection and the mobile device being at the return processing sub-area, that the user may desire, at the merchant location, a transaction history comprising past transactions with the merchant;
determining the transaction history based on the user and the merchant;
determining an item previously purchased in the past transactions from the transaction history;
communicating the transaction history an identification of the the item to the mobile device;
receiving a selection of one of the past transactions in the transaction history from the mobile device;
determining whether the mobile device was previously located in a sub-area of the merchant location associated with the selection using a previous short range wireless connection by the mobile device with a second wireless device at the merchant location;
determining that a return transaction for the one of the past transactions requires additional authentication based on the transaction history and the determining whether the mobile device was previously located in the sub-area; and
communicating the selection and the additional authentication required for the return transaction to a merchant device at the return processing sub-area.

18. The non-transitory machine-readable medium of claim 17, wherein the operations further comprise:
communicating the additional authentication required for the return transaction to the mobile device;
receiving the additional authentication from the mobile device; and
communicating the additional authentication to the merchant device.

19. The non-transitory machine-readable medium of claim 18, wherein the operations further comprise:
determining loyalty account information for a loyalty account of the user with the merchant; and
communicating the loyalty account information to at least one of the merchant device or the mobile device.

20. The non-transitory machine-readable medium of claim 19, wherein the operations further comprise:
receiving a return processing request for the return transaction from the merchant device;
in response to receiving the return processing request, processing the return transaction based on the additional authentication and the one of the past transactions; and
adjusting the loyalty account information based on the processing the return transaction for the one of the past transactions.

* * * * *